US007761473B2

(12) United States Patent  (10) Patent No.: US 7,761,473 B2
Mehrotra et al.  (45) Date of Patent: Jul. 20, 2010

(54) TYPED RELATIONSHIPS BETWEEN ITEMS (75) Inventors: Shishir Samir Mehrotra, Seattle, WA (US); Richard Louis Negrin, Mercer Island, WA (US); Greg S Friedman, Redmond, WA (US); David John Nettleton, Seattle, WA (US); Nigel R Ellis, Redmond, WA (US); Joshua M Michaels, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 11/750,674

(22) Filed: May 18, 2007

(65) Prior Publication Data

US 2008/0288487 A1 Nov. 20, 2008

(51) Int. Cl.
*G06F 17/30* (2006.01)
(52) U.S. Cl. ................................ 707/796; 707/829
(58) Field of Classification Search ......... 707/100–102, 707/104.1
See application file for complete search history.

(56) References Cited

U.S. PATENT DOCUMENTS

| | | | |
|---|---|---|---|
| 4,868,733 A | 9/1989 | Fujisawa et al. | |
| 5,212,821 A | 5/1993 | Gorin et al. | |
| 5,809,297 A | 9/1998 | Kroenke et al. | |
| 5,819,288 A | 10/1998 | De Bonet | |
| 6,401,083 B1 * | 6/2002 | Agarwal et al. | 1/1 |
| 6,766,329 B1 * | 7/2004 | Nicholson | 1/1 |
| 6,941,325 B1 | 9/2005 | Benitez et al. | |
| 7,200,600 B2 * | 4/2007 | Gelfand | 707/100 |
| 7,392,263 B2 * | 6/2008 | Acharya et al. | 1/1 |
| 7,657,558 B2 * | 2/2010 | Bernstein et al. | 1/1 |
| 2004/0181543 A1 | 9/2004 | Wu et al. | |
| 2004/0236769 A1 * | 11/2004 | Smith et al. | 707/100 |
| 2005/0044089 A1 | 2/2005 | Wu et al. | |
| 2005/0049993 A1 | 3/2005 | Nori et al. | |
| 2005/0049994 A1 | 3/2005 | Thompson et al. | |
| 2005/0050053 A1 | 3/2005 | Thompson | |
| 2005/0050054 A1 | 3/2005 | Clark et al. | |
| 2005/0055354 A1 | 3/2005 | Thompson et al. | |
| 2005/0055380 A1 | 3/2005 | Thompson et al. | |
| 2006/0004703 A1 | 1/2006 | Spivack et al. | |
| 2006/0143216 A1 | 6/2006 | Gupta et al. | |
| 2006/0149739 A1 | 7/2006 | Myers | |

(Continued)

OTHER PUBLICATIONS

Storey, "Understanding Semantic Relationships", The VLDB Journal, vol. 2, Issue 4, Oct. 1993, pp. 455-488.

(Continued)

*Primary Examiner*—Debbie Le (57) ABSTRACT

Aspects of the subject matter described herein relate to creating, maintaining, and using relationships between items. In aspects, items such as files, folders, and other objects may be stored in a data store. A user may desire to form a relationship between two items that provides additional semantic information regarding the relationship. To do so, an instance of an item reference is created and populated with data that associates the item reference with a source item and optionally a target item. The item reference is part of a type hierarchy and inherits properties from ancestor types. These types are included in a payload of the item reference and may be exposed to programs that seek to obtain information about the relationship indicated by the item reference. An item reference may be added without changing other data about the referenced items.

17 Claims, 8 Drawing Sheets

U.S. PATENT DOCUMENTS

2006/0173808 A1* 8/2006 Peterson et al. .............. 707/2
2006/0215448 A1  9/2006 Ellis et al.
2007/0027865 A1  2/2007 Bartz et al.
2007/0143317 A1* 6/2007 Hogue et al. ................ 707/100

OTHER PUBLICATIONS

Chen, "The Entity-Relationship Model—Toward a Unified View of Data", TODS, ACM, vol. 1, Issue 1, Mar. 1976, pp. 9-36.

* cited by examiner

TYPED RELATIONSHIPS BETWEEN ITEMS

BACKGROUND

Many consumers use their computers primarily for communication and organizing personal information, whether it is traditional personal information manager (PIM) style data or media such as digital music or photographs. The amount of digital content, and the ability to store the raw bytes, has increased tremendously; however, the methods available to consumers for organizing and unifying this data has not kept pace. Knowledge workers spend enormous amounts of time managing and sharing information, and some studies estimate that knowledge workers spend 15-25% of their time on non-productive information related activities. Other studies estimate that a typical knowledge worker spends about 2.5 hours per day searching for information.

SUMMARY

Briefly, aspects of the subject matter described herein relate to creating, maintaining, and using relationships between items. In aspects, items such as files, folders, and other objects may be stored in a data store. A user may desire to form a relationship between two items that provides additional semantic information pertaining to the relationship. To do so, an instance of an item reference is created and populated with data that associates the item reference with a source item and optionally a target item. The item reference is part of a type hierarchy and inherits properties from ancestor types. Properties corresponding to these types may be included in a payload of the item reference and may be exposed to programs that seek to obtain information about the relationship indicated by the item reference. An item reference may be added without changing other data about the referenced items.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
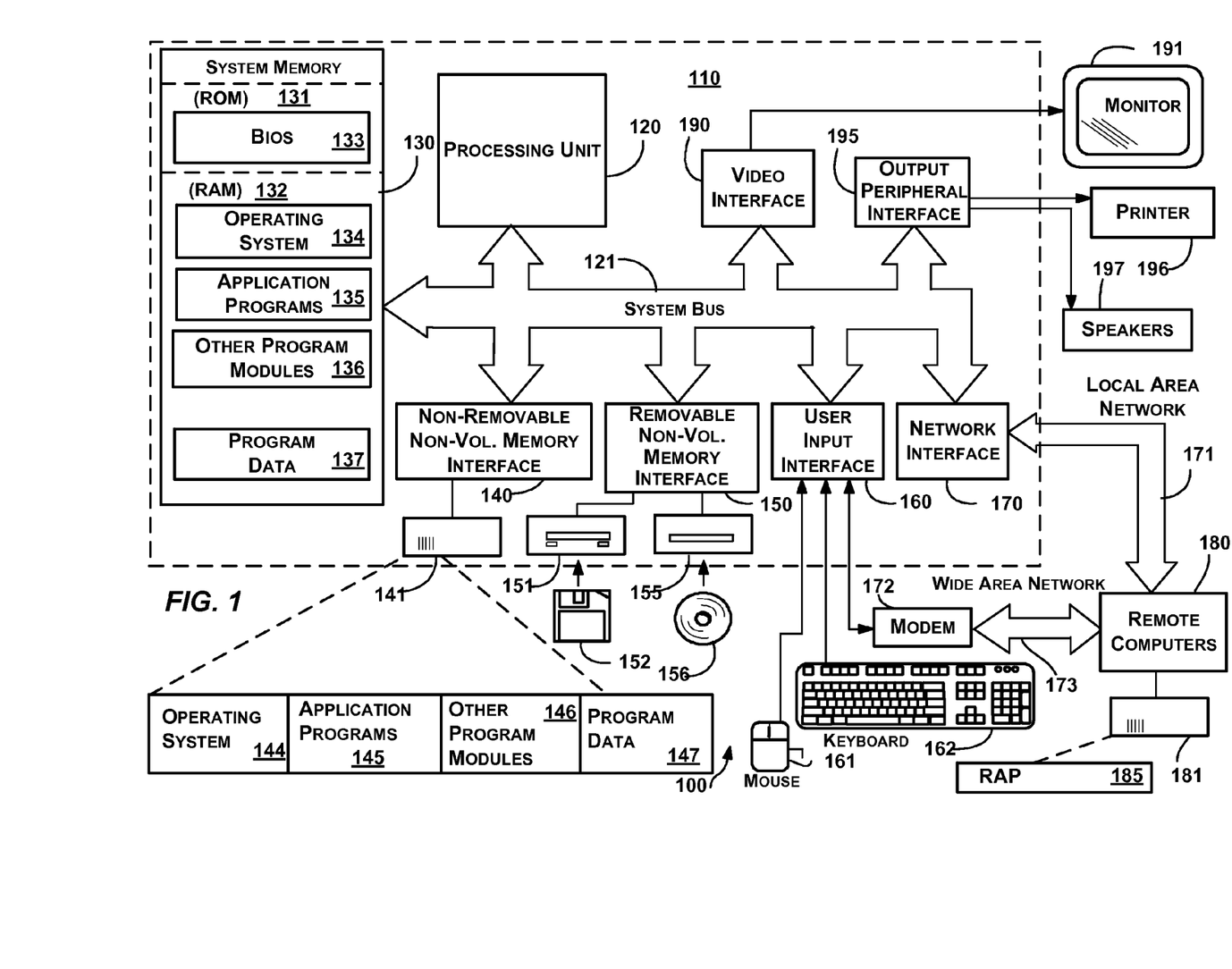
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Organizing Data

A file system may be used to store various items of data. Most file systems give a very limited mechanism for relating data which is referred to herein as a file and folder relationship. In a file and folder relationship, there is a root node (e.g., a root directory), intermediate nodes (e.g., subdirectories), and leaf nodes (folders or files). The relation that exists in a file and folder relationship is that a file or folder is a child (or contained in) another folder and that a folder may be the parent of one or more other files or folders. As used herein, the term "file" includes a "file or folder" unless the context dictates otherwise.

Figure 2:
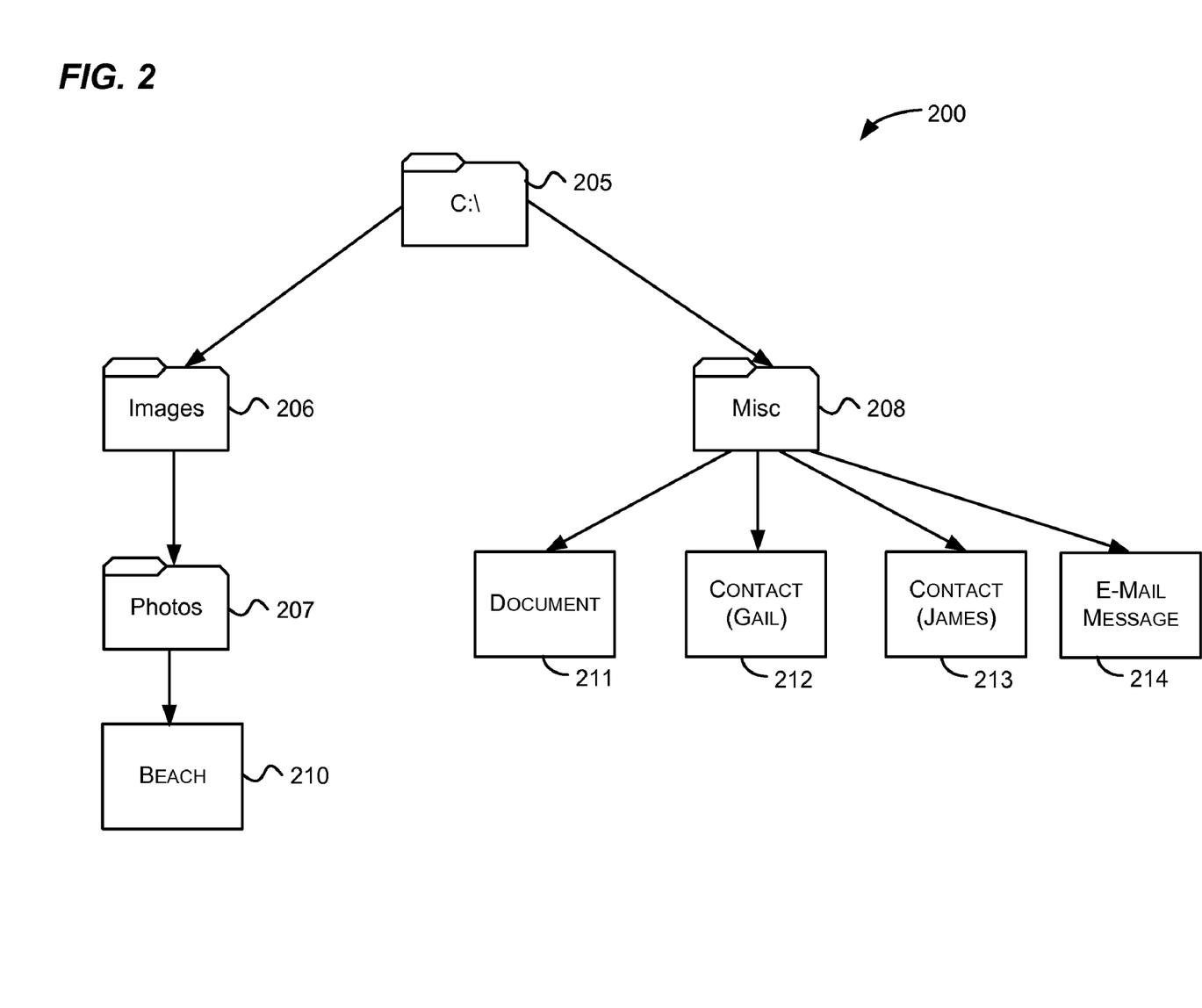
FIG. 2 is a block diagram that illustrates an exemplary file hierarchy according to aspects of the subject matter described herein.

For example referring to FIG. 2, an exemplary file hierarchy is illustrated according to aspects of the subject matter described herein. The file hierarchy 200 includes folders 205-208 and files 210-214.

The file 210 is a beach photo. The file 211 is a document (e.g., word processing, spreadsheet, etc.). The file 212 is a contact file including information about a person (e.g., Gail). The file 213 is a contact file including information about another person (e.g., James). The file 214 is an e-mail message. It will be recognized that the file hierarchy and types of files represented in FIG. 2 are exemplary only and that more, fewer, and other types of files may be represented in other embodiments without departing from the spirit or scope of the subject matter described herein.

A user may name a file or folder to indicate additional information about the file and there may be additional metadata associated with a file, but the user is not able to relate a file to another file except through the folder containment relationship.

For example, in a file and folder relationship, a user would have no way of relating the beach photo 210 to the contact 212. Yet, the user may wish to know who took the photo and who was in the photo. Furthermore, contact information for these people may be included in a file system as contacts 212 and 213 and other contacts (not shown), but in a file and folder relationship, it may not be possible to relate the photo to these people.

Figure 3:
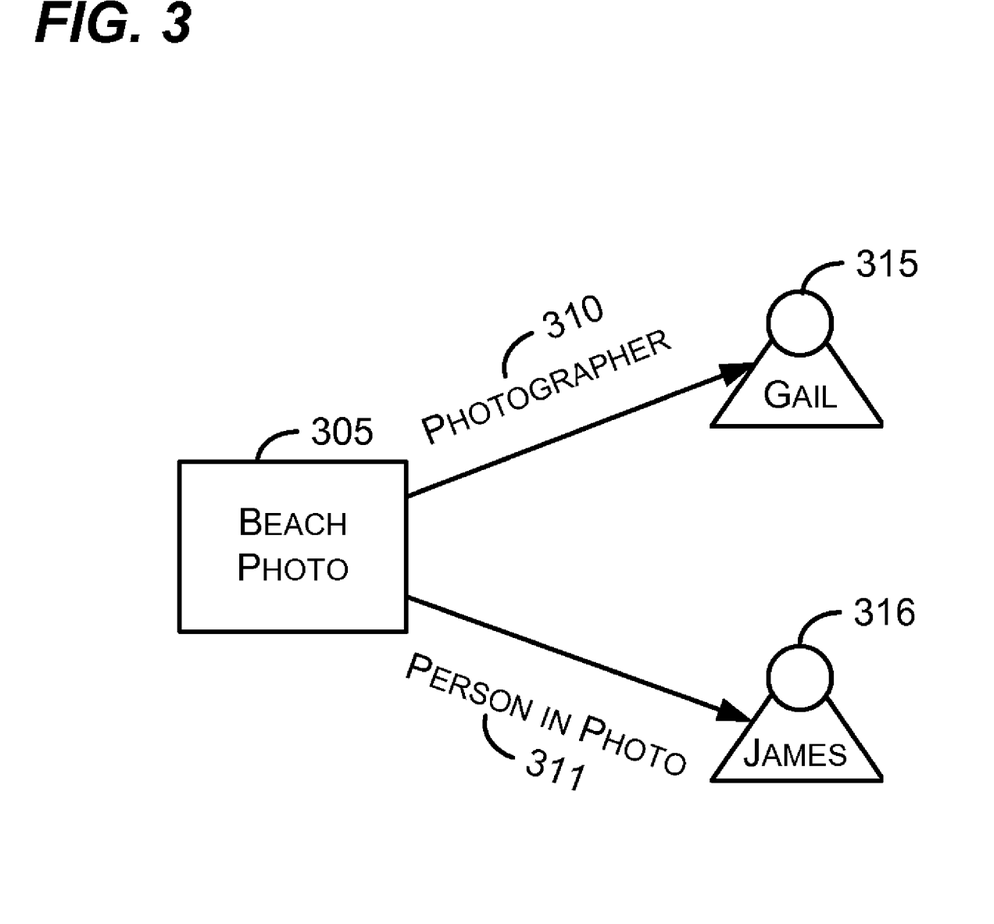
FIG. 3 is a block diagram that generally represents exemplary relationships between items in accordance with aspects of the subject matter described herein.

FIG. 3 is a block diagram that generally represents exemplary relationships between items in accordance with aspects of the subject matter described herein. In one embodiment, the term item indicates a file or folder. In another embodiment, the term item may include any object that data on a computer-readable medium is capable of representing. Some exemplary items include contacts, images, database objects, application data, lists, sets of data (ordered or unordered), and the like.

The diagram shown in FIG. 3 includes a first relationship 310 that indicates that Gail 315 is the photographer of the beach photo 305. The diagram also includes a second relationship 311 that indicates that James 316 is a person in the beach photo 305. Gail 315 and James 316 may each comprise a contact object (e.g., the contact files 212 and 213 of FIG. 2) of a computer.

It will be recognized that the information contained in the diagram of FIG. 3 provides a richness that cannot be provided by a file and folder relationship. For example, if the beach photo included many people and these people were associated with contact data, a user could query to find the e-mail addresses of the people in the beach photo 305. With these e-mail addresses the user could then send the beach photo 305 to those people.

In addition to using a relationship for a query, a relationship may also be used to traverse between items related by the relationship. For example, given an item, the set of relationships originating or terminating at that item may be discovered. After discovery, a relationship may be traversed to discover an item at the other endpoint of the relationship.

An embodiment described herein allows relationships between items. The items may be stored in a traditional file system, database, or other store without departing from the spirit or scope of the subject matter described herein. The embodiment allows the additional information to be overlaid on existing data without modifying the existing data (or types of the existing data) as described in more detail in conjunction with FIG. 4.

Figure 4:
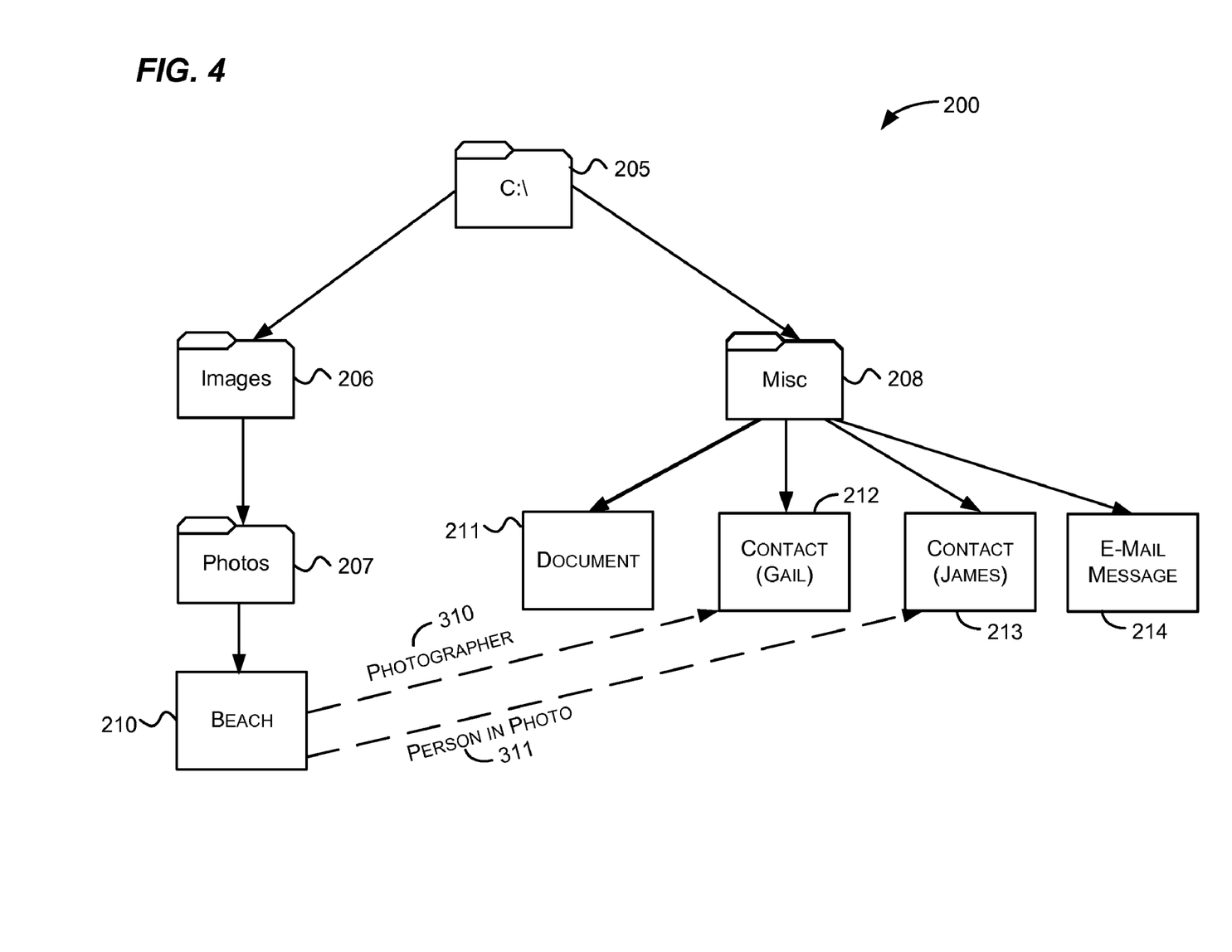
FIG. 4 is a block diagram illustrating the exemplary file hierarchy illustrated in FIG. 2 overlaid with the relationship information described in conjunction with FIG. 3 in accordance with aspects of the subject matter described herein.

FIG. 4 is a block diagram illustrating the exemplary file hierarchy illustrated in FIG. 2 overlaid with the relationship information described in conjunction with FIG. 3 in accordance with aspects of the subject matter described herein. As can be seen in the figure, there are two relationships 310 and 311 from the beach photo 210 to the contacts 212 and 213, respectively. The lines between the beach photo 210 and the contacts 212 and 213 are dotted to represent that the information is not part of the file system hierarchy itself but rather represents relationships that are overlaid on the file system hierarchy. Thus, the file system hierarchy does not need to be changed to add additional relationship information. This not needing to change the underlying schema also applies to schemas other than file system hierarchies.

Figure 5:
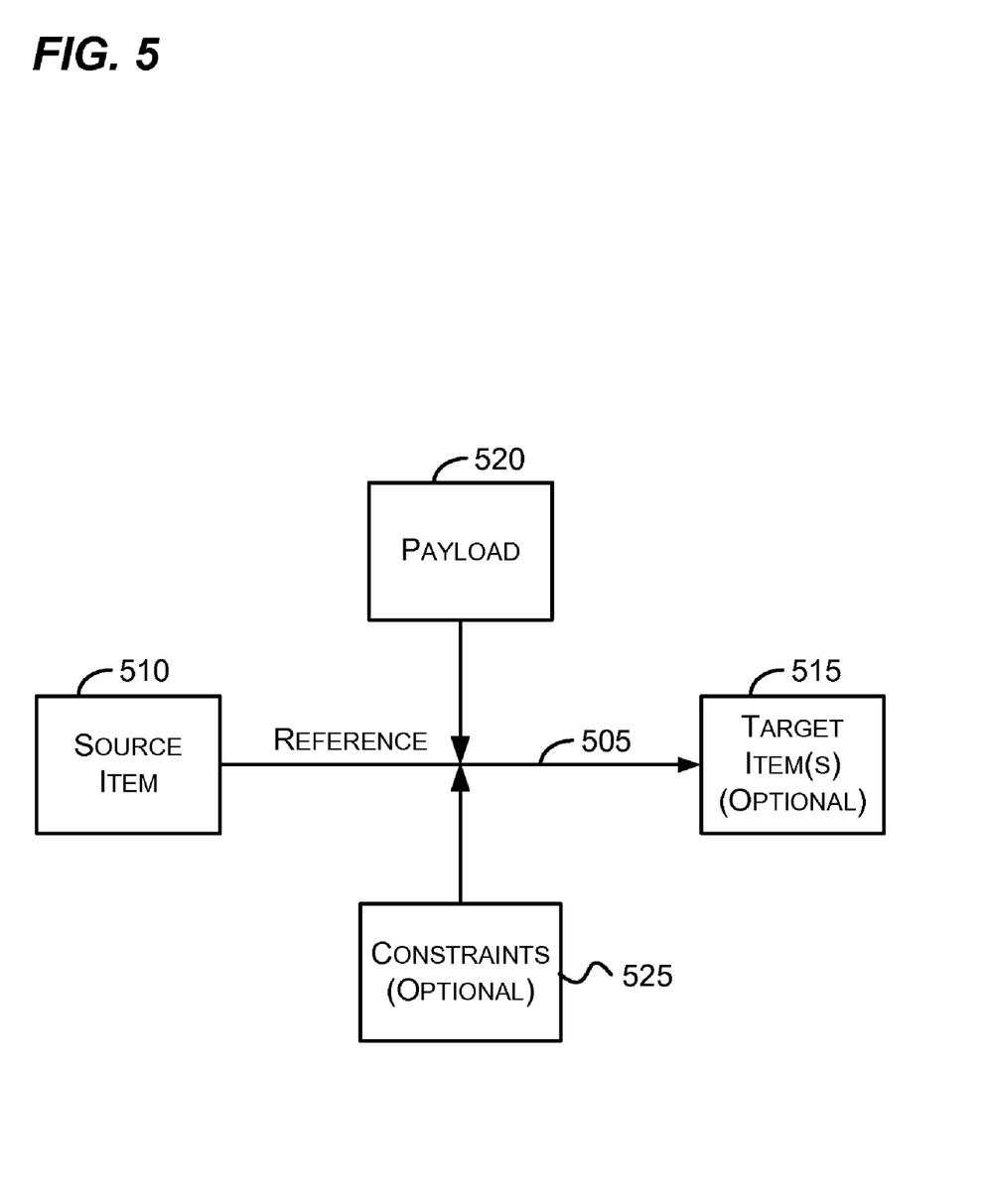
FIG. 5 is a block diagram that generally represents a reference between two items and information associated therewith in accordance with aspects of the subject matter described herein.

In addition to indicating that an item is related to another item, a relationship may also include other information and may be constrained as described in more detail in conjunction with FIG. 5, which is a block diagram that generally represents a reference between two items and information associated therewith in accordance with aspects of the subject matter described herein.

Turning to FIG. 5, a reference 505 may associate a source item 510 with one or more target item(s) 515. While the reference 505 may need a source item 510, the reference 505 does not necessarily need the target item(s) 515. When a reference does not include a target item, this is sometimes referred to as a dangling reference. A dangling reference may occur, for example, when the one or more target item(s) 515 have been deleted or never existed.

A reference may also appear to be dangling when a process does not have security rights to access the target item(s) 515. For example, in one embodiment, the security of the relationship itself may be derived from the security of the source item. If a process can see the source item, it can also see the relationship. Rights to see the destination do not, however, cause the relationship to be visible.

Furthermore, the reference 505 may depend upon the existence of the source item 510 but may not depend upon the existence of the target item(s) 515. When the source items 510 is deleted, the reference 505 may cease to exist (e.g., be deleted). If the target item(s) 515 are deleted (or never existed), however, the reference 505 may continue to exist as long as the source item 510 exists. In other words, the lifetime of a relationship may be a function of the lifetime of its source item. Deleting an item causes all relationships sourced at that item to also be deleted.

Figure 6:
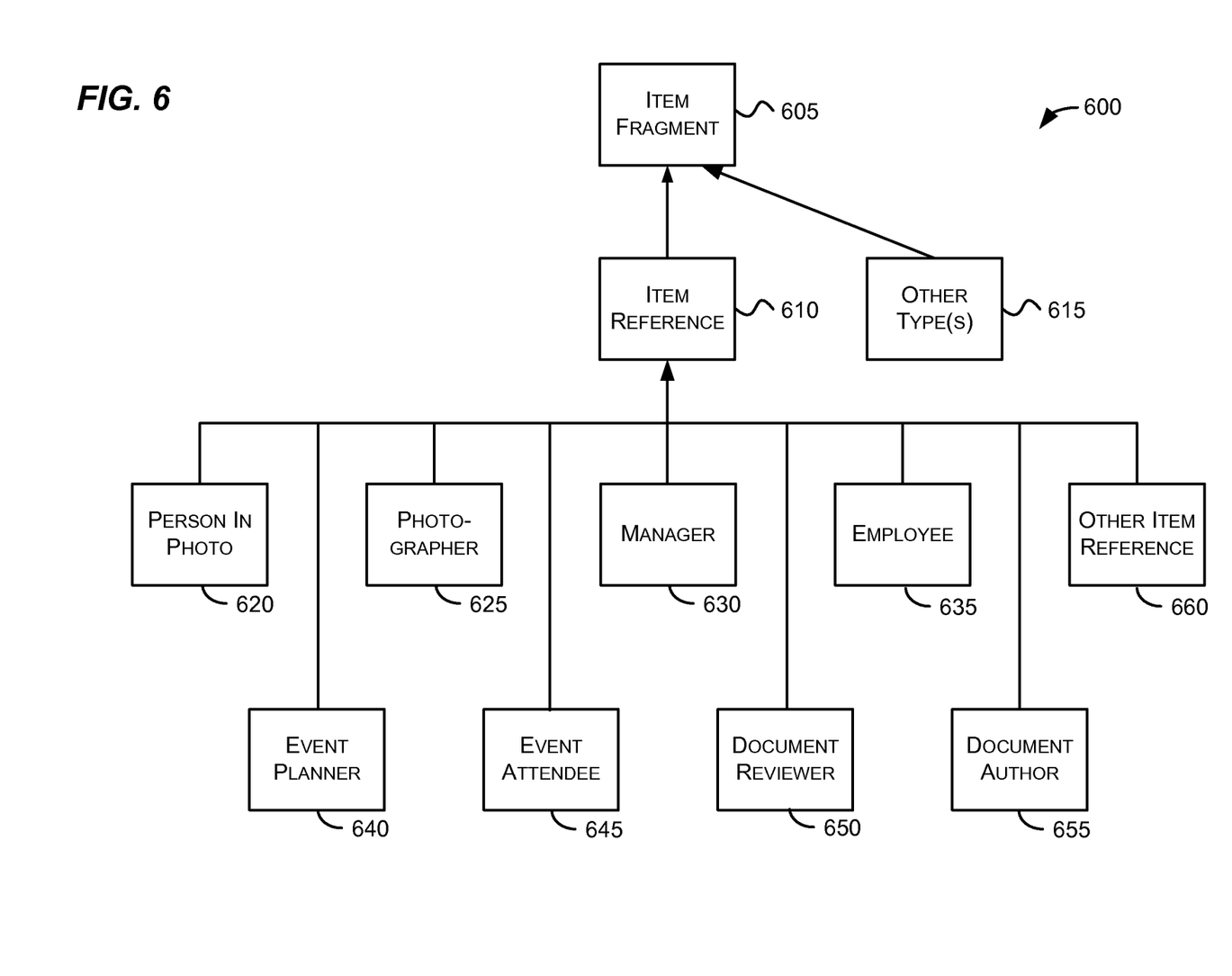
FIG. 6 is a block diagram illustrating an exemplary type hierarchy in accordance with aspects of the subject matter described herein.

The reference 505 may be of instance of a type in a type hierarchy as described in more detail in conjunction with FIG. 6. As such, the reference 505 may include or be associated with a payload 520 that includes properties associated with its type. Thus, in addition to associating a source item with a target item, a reference may also include or be associated with properties. These properties may be exposed such that a program querying the reference may obtain information included in the properties. Each of the properties may include simple (e.g., scalar, text, built-in type, etc.) or complex data (e.g., data according to a user or system defined type, compositions of simple and/or other complex data types, and the like).

In addition, because a reference may be an instance of a type, in one embodiment, the traditional rules of polymorphism may apply to the reference. For example, in polymorphism, a single polymorphic operator may act on expressions of various types. In addition, a polymorphic function may evaluate values of different types. For example, in a type hierarchy in which person inherits from contact, a function which takes a contact as a parameter type may receive parameters of type contact or person or any type that derives from contact. These and other polymorphic principles may be applied to a reference without departing from the spirit or scope of aspects of the subject matter described herein.

Furthermore, a relationship may be precise or imprecise. A precise relationship specifies a particular source item and a particular target item. An imprecise relationship specifies a source item and a set of other related items based on information included in the other items. For example, a source item may be related to all items that have the letter 'A' in their names. As another example, a source item may be related to items that meet certain criteria specified by the relationship.

There may be type constraints 525 associated with a relationship type. For example, one type of relationship may be "Photographer". The constraints associated with the Photographer relationship may require the source to be a photo and the destination to be a contact. When a Photographer relationship is instantiated and is associated with particular source and target item, the system may validate that the types of the source and target items do not violate the type constraints associated with the Photographer relationship type.

Constraints may be used to enforce integrity in the system. For example, when traversing an item reference, a program traversing may know what types the source and target items are.

In one embodiment, the reference 520 and other references (not shown) between items may be stored in a database. The database may, for example, include fields that correspond to the source item's identifier, the target item's identifier, the type of the reference, and properties of the reference. In another embodiment, the reference 520 may be stored in an object that includes this information. Indeed, many types of stores may be used to store references as will be understood by those skilled in the art without departing from the spirit or scope of aspects of the subject matter described herein.

Although some of the embodiments described above have referenced hierarchical file systems, it will be appreciated that in other embodiments aspects of the subject matter described herein may also be applied to items in other configurations including, for example, items in a directed acyclic graph, an arbitrary graph (e.g., including cycles), file systems having richly typed objects (the structure of which is understood by the underlying storage system), an ordered or unordered set, and the like.

For example, in storage systems that are able to understand the semantics of e-mail objects, a "from" reference may establish a relationship between a mail message and a contact in a contacts database, a set of one or more "to" references may establish relationships between the mail message and one or more contacts corresponding to recipients of the mail message, a set of one or more "cc" references may establish relationships between the mail message and one or more contacts corresponding to CC recipients of the mail message, and so forth.

FIG. 6 is a block diagram illustrating an exemplary type hierarchy in accordance with aspects of the subject matter described herein. It should be noted that the type hierarchy illustrated in FIG. 6 is exemplary and that more, fewer, and/or different types may exist in other type hierarchies without departing from the spirit or scope of aspects of the subject matter described herein.

The type hierarchy 600 may include a base class of an item fragment 605. The item fragment 605 may have as children an item reference 610 and other type(s) 615. The item reference 610 may have as children person in photo 620, photographer 625, manager 630, employee 635, event planner 640, event attendee 645, document reviewer 650, document author 655, and one or more other item references 655.

Each of the types (605, 610, 615, 620, 625, 630, 635, 640, 645, 650, 655, and 660) may include properties. In accordance with object-oriented inheritance principles, a child type includes the properties of its parent and may also include additional properties.

Item fragment 605 may include properties that correspond to fragments of an item. For example, an instance of an item fragment 605 may include a property that identifies an e-mail address of a person from whom an e-mail message was sent. Another instance of an item fragment may include a property of an e-mail address of a person to whom the e-mail message was sent. The item fragment 605 may include a property that is capable of storing an identifier to a source item.

The item reference 610 may extend the item fragment 605 properties to include a property that is capable of storing an identifier of a target item, whereas the other type(s) 615 may not include this additional property. For example, if the other type(s) 615 included a message body type, this message body type may include a text field to store the body of an e-mail message.

In one embodiment, the user may not be able to directly manipulate the properties of an item fragment. For example, an item fragment may indicate the size of a document. While a user may change the size of the document by adding more text to the document, the user may not be able to change the size of the document directly. In another embodiment, a user may be able to directly manipulate the properties of an item fragment.

The document reviewer 650 may include reviewer status, reviewer comments, and so forth. The document author 655 may include information about a document author. Similarly, in the other types and subtypes, a child type may extend the properties of its parent types. As mentioned previously, a property of a type may be simple or complex.

Figure 7:
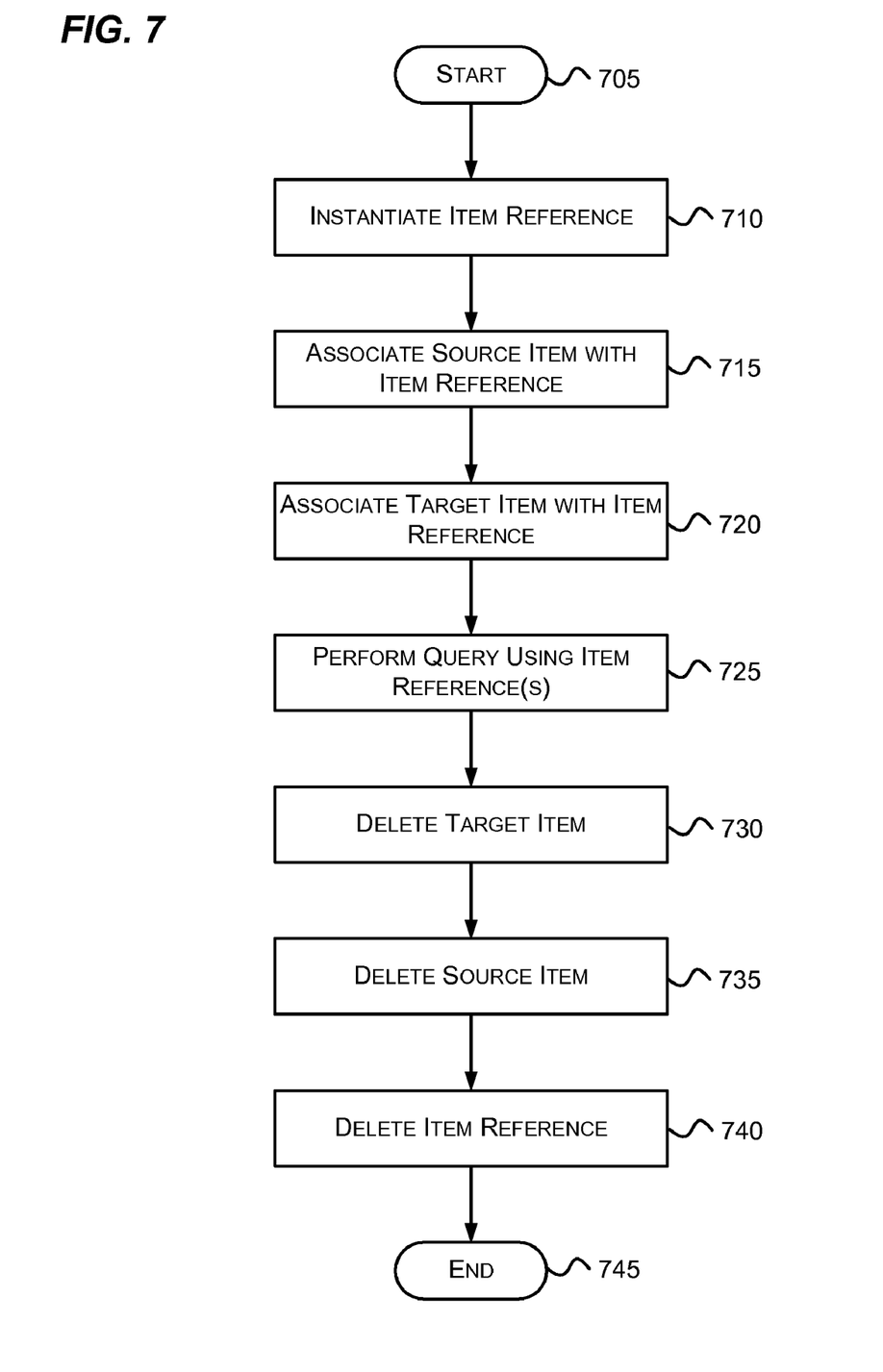
FIG. 7 is a flow diagram that generally represents exemplary actions that may occur that involve item references in accordance with aspects of the subject matter described herein.

FIG. 7 is a flow diagram that generally represents exemplary actions that may occur that involve item references in accordance with aspects of the subject matter described herein. For simplicity of explanation, the method described in conjunction with FIG. 7 is depicted and described as a series of acts. It is to be understood and appreciated that the aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the method in accordance with aspects of the subject matter described herein. In addition, those skilled in the art will understand and appreciate that the method could alternatively be represented as a series of interrelated states via a state diagram or events.

At block 705, the actions begin. At block 710, an item reference is instantiated. For example, referring to FIG. 4, an item reference for relating the beach photo 210 to a contact with the contacts file 212 may be created.

At block 715, the source item is associated with the item reference. For example, a source field of the item reference may be updated to include an identifier of a source item. For example, referring to FIG. 4, a reference corresponding to the relationship 310 may be updated to include an identifier (e.g., a globally unique identifier) associated with the beach photo 210. In one embodiment, if there is a source type constraint, at block 715, it is validated and if the source type constraint is not satisfied an error is generated.

At block 720, the target item is associated with the item reference. For example, a target field of the item reference may be updated to include an identifier of a target item. For example, referring to FIG. 4, the reference corresponding to the relationship 310 may be updated to include an identifier associated with a contact within the contacts file 212. This action is optional as an item reference may exist without being associated with a target item. In one embodiment, if there is a target type constraint, at block 720, it is validated and if the target type constraint is not satisfied an error is generated.

At block 725, a query is performed using one or more item references. For example, referring to FIG. 4, a user may issue a query to determine the e-mail address of the people in the beach photo 305. Traversal of the reference may also occur in lieu of, or in addition to, a query. Again, either of these actions is optional.

At block 730, the target item is deleted. For example, referring to FIG. 4, the contact associated with the relationship 310 may be deleted. Again, this action is optional. Note, that deleting the target item does not affect the relationship.

At block 735, the source item is deleted. For example, referring to FIG. 4, the beach photo 210 may be deleted. Again, this action is optional. When the source item is deleted, this causes the item reference to be deleted, which is what occurs at block 740.

At block 745, the actions end.

Figure 8:
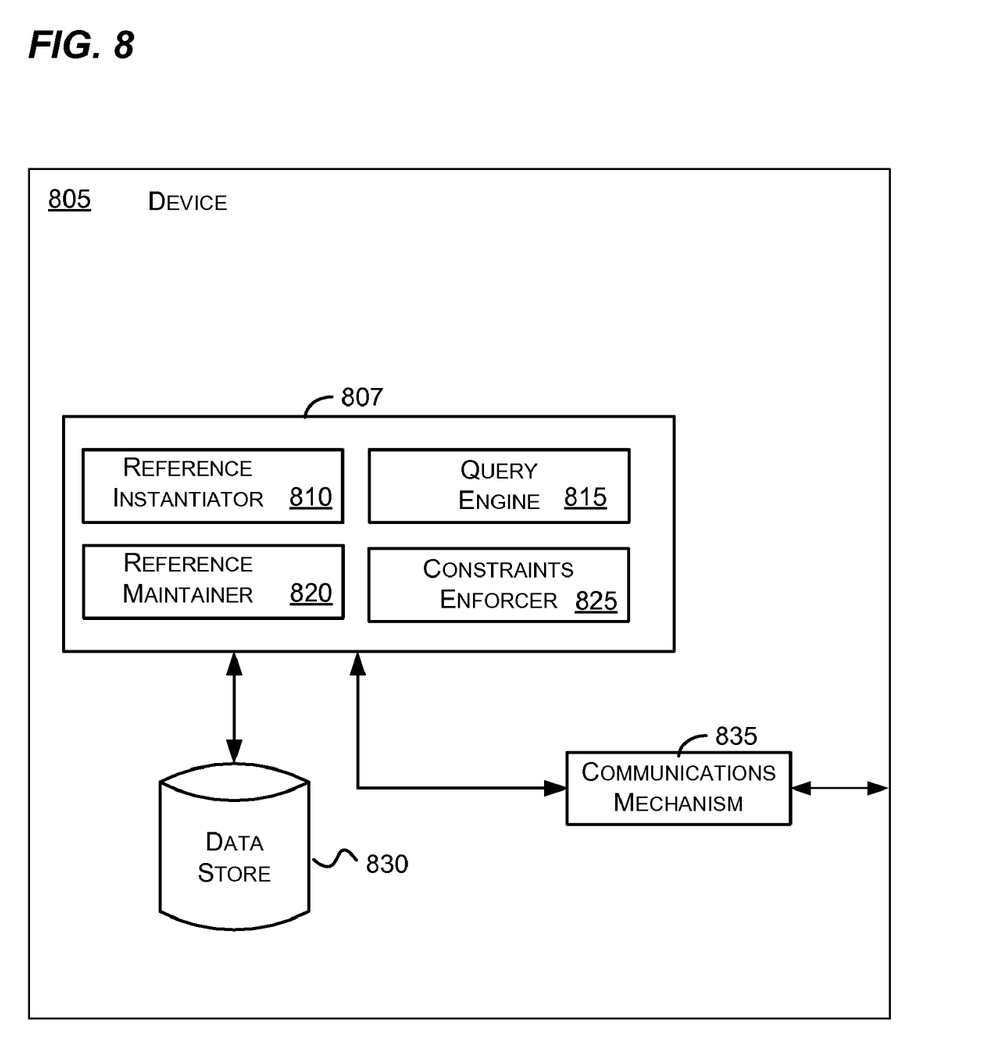
FIG. 8 is a block diagram that represents an exemplary device configured to operate in accordance with aspects of the subject matter described herein.

FIG. 8 is a block diagram that represents an exemplary device configured to operate in accordance with aspects of the subject matter described herein. The device 805 may include reference components 807 that include a reference instantiator 810, a query engine 815, a reference maintainer 820, and a constraints enforcer 825. In addition, the device may include a data store 830 and a communications mechanism 835.

The reference instantiator 810 may create a new instance of a reference and fill in the fields of the reference as appropriate to associate the reference with a source item and optionally a target item. The reference instantiator 810 may cause the new instance to include properties associated with ancestors of the type of the reference in accordance with a type hierarchy associated with the reference. The reference instantiator 810 may cooperate with a constraints enforcer 825 to ensure that only items of the appropriate type are referenced via the new instance of a reference.

The reference maintainer 820 may maintain references. When target items are deleted, the reference maintainer may update the target field of the appropriate references as appropriate to indicate that the items are no longer available. When a source target is deleted, the reference maintainer 820 may delete its associated reference(s).

The query engine 815 may access references and their referred-to items to service queries from a user, for example. The query engine may comprise a component of a database, for example.

The data store 830 may store the items that are referenced with by the references and/or may store data comprising the references. The data store 830 may comprise a file system, database, or other data store and may be distributed across multiple devices. The data store 830 may be external or internal to the device 805.

The communications mechanism 835 allows the device 805 to communicate with other devices to service queries and/or store and retrieve references. The communications mechanism 640 may be a network interface or adapter 170, modem 172, or any other means for establishing communications as described in conjunction with FIG. 1.

It will be recognized that other variations of the device 805 shown in FIG. 8 may be implemented without departing from the spirit or scope of aspects of the subject matter described herein. Furthermore, components described in conjunction with FIG. 8 may be combined or further separated in other embodiments. In addition, it will be recognized that more, fewer, or other components may exist on the device 805 without departing from the spirit or scope of aspects of the subject matter described herein.

As can be seen from the foregoing detailed description, aspects have been described related to creating, maintaining, and using relationships between items. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable medium that includes a computer readable storage medium having computer-executable instructions stored thereon, which when executed perform actions, comprising:

instantiating an item reference, the item reference including a first field, a second field, and a third field, the first field capable of storing an identifier of a first file of a file system, the second field capable of storing an identifier of a second file of the file system, the third field capable of storing one or more properties associated with a type of the item reference, the item reference indicating a relationship between the first file and the second file;

placing the identifier of the first file in the first field; and performing a computerized query that utilizes the relationship to identify the second file, the query having criteria that applies to the second file;

wherein the item reference is of a type that inherits properties from ancestors of the item reference.

2. The computer-readable medium of claim 1, wherein the file system is hierarchical.

3. The computer-readable medium of claim 1, wherein instantiating the item reference and placing the identifier of the first file in the item reference does not change any data included in the first or second files and does not change any information the file system maintains about the first and second files.

4. The computer-readable medium of claim 1, wherein at least one of the files comprises a data file.

5. The computer-readable medium of claim 1, wherein at least one of the files comprises a folder that is capable of containing files and other folders.

6. The computer-readable medium of claim 1, further comprising placing the identifier of the second file in the second field.

7. The computer-readable medium of claim 1, further comprising deleting the item reference in response to the first file being deleted.

8. The computer-readable medium of claim 1, further comprising constraining what types of the first file and the second file may be related via the item reference.

9. A method implemented at least in part by a computer, the method comprising:

instantiating an item reference, the item reference including a first field, a second field, and a third field, the first field capable of storing an identifier of a first item stored in a data store, the second field capable of storing an identifier of a second item stored in the data store, the third field capable of storing data including properties associated with a type of the item reference, items in the data store being of a plurality of types, each item being of at least one type, the item reference indicating a relationship between the first item and the second item;

placing the identifier of the first item in the first field of the item reference; and performing a computerized query that utilizes the relationship to identify the second file, the query having criteria that applies to the second file;

the item reference being of a type that inherits properties from ancestors of the item reference.

10. The method of claim 9, wherein the first item comprises a first folder that is capable of including files and other folders and the second item comprises a file in a second folder.

11. The method of claim 9, wherein the first item comprises a contact that includes contact information regarding an entity and wherein the second item comprises an image.

12. The method of claim 9, further comprising storing the item reference in a data store.

13. The method of claim 12, wherein the data store comprises a relational database.

14. The method of claim 12, wherein the data store comprises an object-oriented database.

15. The method of claim 12, wherein the data store comprises a file of a file system.

16. In a computing environment, an apparatus, comprising:

a reference instantiator operable to use at least one processor to instantiate an item reference, the item reference including a first field, a second field, and a third field, the first field capable of storing an identifier of a first item stored in a data store, the second field capable of storing an identifier of a second item stored in the data store, the third field capable of storing data including properties associated with a type of the item reference, items in the data store being of a plurality of types, each item being of at least one type, the item reference indicating a relationship between the first item and the second item; and a reference maintainer operable to delete item references;

the item reference being of a type that inherits properties from ancestors of the item reference; and wherein the reference maintainer operates to delete an item reference when a source item associated with the item reference is deleted.

17. The apparatus of claim 16, further comprising a constraints enforcer operable to indicate whether the item reference is allowed to associate a first item with a second item.

* * * * *